US008663506B2

(12) United States Patent
Chandrasekhar et al.

(10) Patent No.: US 8,663,506 B2
(45) Date of Patent: Mar. 4, 2014

(54) PROCESS FOR UNIFORM AND HIGHER LOADING OF METALLIC FILLERS INTO A POLYMER MATRIX USING A HIGHLY POROUS HOST MATERIAL

(75) Inventors: Bukkinakere Kapanipathaiya Chandrasekhar, Bangalore (IN); Shalini Kandoor, Karnataka (IN); Adyam Srinivasa Mukunda, Bangalore (IN)

(73) Assignee: Laird Technologies, Inc., Earth City, MO (US)

( * ) Notice: Subject to any disclaimer, the term of this patent is extended or adjusted under 35 U.S.C. 154(b) by 979 days.

(21) Appl. No.: 12/770,234

(22) Filed: Apr. 29, 2010

(65) Prior Publication Data

US 2010/0276630 A1    Nov. 4, 2010

(30) Foreign Application Priority Data

May 4, 2009    (IN) .......................... 1164/MUM/2009

(51) Int. Cl.
*H01B 1/00* (2006.01)
*H01B 1/24* (2006.01)
*H01B 1/06* (2006.01)
*H01B 1/02* (2006.01)

(52) U.S. Cl.
USPC ........... 252/500; 252/506; 252/508; 252/513; 252/518.1

(58) Field of Classification Search
USPC .............. 423/445 R; 252/500, 506, 508, 513, 252/518.1
See application file for complete search history.

(56) References Cited

U.S. PATENT DOCUMENTS

| 2,455,666 A | 12/1948 | Fournier |
| 2,501,699 A | 3/1950 | Stecker |
| 2,572,483 A | 10/1951 | Howle |

(Continued)

FOREIGN PATENT DOCUMENTS

| EP | 0 306 172 A1 | 8/2008 |
| GB | 203 354 A | 9/1923 |

(Continued)

OTHER PUBLICATIONS

European Office Action in European Application No. 10161758.7 which lists the same inventors as the instant application, and is related to the instant application through a priority claim; dated Oct. 6, 2010; 6 pages.

(Continued)

*Primary Examiner* — Ling Choi
*Assistant Examiner* — Thuy-Ai Nguyen
(74) *Attorney, Agent, or Firm* — Harness, Dickey & Pierce, P.L.C.

(57) ABSTRACT

A method relating to making a metal coated filler includes mixing a solution of an organic diol with a plurality of porous filler particles to obtain a support mixture; contacting a metal salt solution with the support mixture forming a reaction mixture; and heating the reaction mixture to a temperature within a temperature range from about 50 degrees Celsius to about 200 degrees Celsius. The metal cations in the metal salt solution are reduced to metal particles by the organic diol and are disposed on the porous filler particles and on filler particle pore surfaces. The metal coated filler may then be optionally isolated. Electrically and/or thermally conductive articles including the metal coated fillers and methods for their manufacture are also disclosed.

15 Claims, 2 Drawing Sheets

(56) References Cited

U.S. PATENT DOCUMENTS

| | | | |
|---|---|---|---|
| 2,621,160 | A | 12/1952 | Johnson et al. |
| 3,097,832 | A | 7/1963 | Murdock et al. |
| 4,353,741 | A | 10/1982 | Capuano et al. |
| 4,525,388 | A | 6/1985 | Rehder et al. |
| 5,322,641 | A * | 6/1994 | Shiel et al. ............ 252/514 |
| 5,529,804 | A | 6/1996 | Bonneau et al. |
| 5,660,931 | A | 8/1997 | Kim et al. |
| 5,846,309 | A | 12/1998 | Freeman et al. |
| 5,968,655 | A * | 10/1999 | Hartung et al. ............ 428/423.1 |
| 6,680,081 | B2 | 1/2004 | Fukushima et al. |
| 7,361,313 | B2 | 4/2008 | Chan et al. |
| 2002/0142094 | A1 | 10/2002 | Fukushima et al. |
| 2004/0161369 | A1 | 8/2004 | Chan et al. |
| 2005/0202244 | A1 | 9/2005 | Papagianakis |
| 2005/0227074 | A1 | 10/2005 | Oyamada et al. |
| 2006/0073335 | A1 | 4/2006 | Oyamada et al. |
| 2006/0075930 | A1 | 4/2006 | Wang et al. |
| 2007/0207335 | A1 * | 9/2007 | Karandikar et al. .......... 428/560 |
| 2008/0241543 | A1 | 10/2008 | Kempf et al. |

FOREIGN PATENT DOCUMENTS

| | | |
|---|---|---|
| JP | S56-166265 | 12/1981 |
| JP | S58-141253 | 8/1983 |
| JP | H03-067402 | 3/1991 |
| JP | H05-186716 | 7/1993 |
| JP | H08-048792 | 2/1996 |
| JP | H09-511026 | 11/1997 |
| JP | 2000-313823 | 11/2000 |
| JP | 2003-002710 | 1/2003 |
| JP | 2004-131800 | 4/2004 |
| JP | 2008-060043 | 3/2008 |
| JP | 2008-063449 | 3/2008 |
| JP | 2008-259993 | 10/2008 |
| TW | 200634066 | 10/2006 |
| WO | WO 95/26843 | 10/1995 |
| WO | WO2006/086369 | 8/2006 |
| WO | WO 2007/128015 | 11/2007 |
| WO | WO 2007/128015 A2 | 11/2007 |
| WO | WO2008/056123 | 5/2008 |
| WO | WO 02/057029 A1 | 7/2010 |

OTHER PUBLICATIONS

Preparation and Characterization of Conductive Latex Based on Polyaniline-Perlite Composite; Nasser Arsalani and Mohammad Hayatifar, Journal of Applied Polymer Science, vol. 93, pp. 2528-2531 (2004).

European Patent Office Search Report issued for European Application No. 10161758.7 dated Jul. 7, 2010 (3 pages).

Japanese Office Action issued Jun. 5, 2012 for Japanese patent application No. 2010-106541 (laid open on Nov. 18, 2010 as publication No. 2010-261040). Japanese patent application No. 2010-106541 lists the same inventors and also claims priority to the same parent application as the instant application (India Application No. 1164/MUM/2009 filed May 4, 2009); 3 pages.

English translation of Japanese Office Action issued Jun. 5, 2012 for Japanese patent application No. 2010-106541 (laid open on Nov. 18, 2010 as publication No. 2010-261040) that was previously disclosed in the Supplemental IDS electronically filed on Jun. 14, 2012. Japanese patent application No. 2010-106541 lists the same inventors and also claims priority to the same parent application as the instant application (India Application No. 1164/MUM/2009 filed May 4, 2009); 2 pages.

Taiwan Examination and Search Report issued for counterpart Taiwanese Patent Application No. 099114029 dated Mar. 22, 2013 and English Summary of Opinion; 8 pgs.

* cited by examiner

PROCESS FOR UNIFORM AND HIGHER LOADING OF METALLIC FILLERS INTO A POLYMER MATRIX USING A HIGHLY POROUS HOST MATERIAL

CROSS-REFERENCE TO RELATED APPLICATION

This application claims priority to India Patent Application No. 1164/MUM/2009 filed May 4, 2009. The entire disclosure of the above application is incorporated herein by reference.

BACKGROUND

This section provides background information related to the present disclosure which is not necessarily prior art. The present disclosure relates to conductive metal coatings on porous filler materials. The disclosure describes the methods for making such filler materials and using such materials in electrical and/or thermal applications.

Enhancement of electrical and thermal conductivities of composite material requires suitable fillers with high filler loadings. Typical fillers used for making conductive articles include metals, metallic salts (e.g., aluminum salts, etc.), ceramics (e.g., calcium salts, aluminum nitride, boron nitride, calcium phosphates, hydroxyapatite, calcium carbonates, calcium sulfates, combinations thereof, etc.) and carbon (e.g., carbon fibers, graphite, carbon black in various forms ranging from nano to micrometer size range, etc.). The main objective in the field of electrically conductive and thermally conductive article manufacture is to obtain desired property values with minimum amounts of fillers. High electrical and thermal conductive values require higher amount of filler loading. Fillers have different densities, which therefore results in segregation (especially of higher densities). In view of this, uniform distribution of fillers is difficult to achieve. An inhomogeneous distribution of fillers will lead to poor and inconsistent properties.

High loading of fillers is difficult to achieve in view of enhanced viscosities during processing such as injection molding. Further, differences in densities lead to segregation resulting in heterogeneity. Traditionally, metallic coatings such as silver or nickel are applied on to the surface of glass beads or polystyrene balls to reduce the cost of fillers. Though this may provide higher conductivity at a lower cost, a small discontinuity will result in failure of conducting path.

The separation at the interface between metal and host particles presents significant challenges in the manufacture of metallized filler or carrier particles. Since the filler particles and the metal to be coated thereon have different interfacial properties, the metal will likely separate from the filler particles due to changes with time or environmental changes (especially temperature changes and shear during processing), resulting in a reduced conductivity.

In order to prevent powder particle-metal separation and produce powder particles having a metal coating closely adhered thereto, others in the field have tried to ameliorate the above stated problems by producing filler particles that are etched to introduce irregularities in their surface to increase the surface area thereby improve the metal adhesion. Powder particles have also been treated with a silane coupling agent such as a monomeric silane, typically gamma-aminopropyl-triethoxysilane for improving the metal adhesion. Powder particles have also been treated with an organic resin such as an epoxy resin for improving the metal adhesion.

SUMMARY

This section provides a general summary of the disclosure, and is not a comprehensive disclosure of its full scope or all of its features.

In one aspect, embodiments are provided of metal coated fillers that include porous filler particles having pores and metal particles coated on the filler particles and inside the pores.

In a further aspect, the present technology provides embodiments of methods relating to making metal coated fillers. In an exemplary embodiment, a method generally includes mixing a solution of an organic diol with a plurality of porous filler particles to obtain a support mixture; contacting a metal salt solution with the support mixture forming a reaction mixture; and heating the reaction mixture to a temperature within a temperature range from about 50 degrees Celsius to about 200 degrees Celsius. Metal cations in the metal salt solution are reduced to metal particles and are disposed on the porous filler particles and on filler particle pore surfaces. The method may also include an optional isolation step to isolate the metal coated filler using filtration, centrifugation, sedimentation techniques, etc.

Articles that include metal coated fillers disclosed herein and/or that are produced by methods disclosed herein may include electrically and/or thermally conductive articles, such as tapes, polymeric films, polymer composites, highly thermally conductive injection moldable thermoplastic composites, highly electrically conductive injection moldable thermoplastic composites, conductive adhesives, etc. The articles may include coated porous particles along with other high aspect ratio fillers.

Further areas of applicability will become apparent from the description provided herein. The description and specific examples in this summary are intended for purposes of illustration only and are not intended to limit the scope of the present technology.

It should be noted that the figures set forth herein are intended to exemplify the general characteristics of materials and methods among those of the present technology, for the purpose of the description of certain embodiments. These figures may not precisely reflect the characteristics of any given embodiment, and is not necessarily intended to define or limit specific embodiments within the scope of this technology.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. The following definitions and non-limiting guidelines must be considered in reviewing the description of the technology set forth herein.

The headings (such as "Background" and "Summary") and sub-headings used herein are intended only for general organization of topics within the present technology, and are not intended to limit the disclosure of the present technology or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. Any discussion of the content of references cited in the Background is intended merely to provide a general summary of assertions made by the authors of the references, and does not constitute an admission as to the accuracy of the content of such references. All references cited in the "Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "comprise", "include," and variants thereof are intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting ingredients, components or process steps, Applicants specifically envision embodiments consisting of, or consisting essentially of, such ingredients, components or processes excluding additional ingredients, components or processes (for consisting of) and excluding additional ingredients, components or processes affecting the novel properties of the embodiment (for consisting essentially of), even though such additional ingredients, components or processes are not explicitly recited in this application. For example, recitation of a composition or process reciting elements A, B, and C specifically envisions embodiments consisting of, and consisting essentially of, A, B, and C, excluding an element D that may be recited in the art, even though element D is not explicitly described as being excluded herein.

The present technology builds on and increases the efficiencies of carrier systems coated with metal particles for electrically conductive and/or thermally conductive applications. For example, some embodiments of the present technology provide carrier systems having improved uniformity of metal particle distribution throughout a matrix.

Embodiments of the present technology provide metal collated fillers comprising a plurality of porous filler particles having a plurality of pores; and a plurality of metal particles coated on the filler particles and inside the plurality of pores (including interior surfaces of the pores). As noted above, the inventors hereof have recognized that high loading of fillers is difficult to achieve in view of enhanced viscosities during processing, such as injection molding. Further, the inventors have recognized that differences in densities lead to segregation resulting in heterogeneity. Both these problems may be overcome in embodiments of the present technology disclosed herein, such as by coating metallic fillers (e.g., copper, silver, etc.) onto and into a highly porous material, such as perlite.

Metal particles useful in the exemplary compositions and methods of the present technology include metal particles of the Groups 8-12 (IUPAC) or Groups VIIIB, IB and IIB (CAS) of the periodic table. Such metals include gold, silver, platinum, copper, iron, palladium, cobalt, palladium, nickel, aluminum, zinc, and alloys thereof. The metallic salt solutions may contain metal-containing cations, such as $Cu^+$, $Cu^{2+}$, $[Cu(NH_3)_4]^{2+}$, $Ni^{2+}$, $Pd^{2+}$, $Pt^{2+}$, $Au^+$, $Au^{3+}$, $Zn^{2+}$, $Ag^+$, $Al^{3+}$, $Cd^{2+}$, $Fe^{2+}$, and $Fe^{3+}$. The metallic salt solution can comprise the aforementioned metal cation or combination of metal cations with anionic species that are part of simple anions, oxoanions, and organic acid anions. The metal cations can be in the form of aqueous or non aqueous solutions. In some embodiments, the anion species which form the metallic salt can include: $Cl^-$, $OH^-$, $NO_3^-$, $NO_2^-$, $PO_4^{3-}$, $PO_3^{3-}$, $HPO_4^{2-}$, $H_2PO_4^-$, $MnO_4^-$, $SO_4^{2-}$, $SO_3^{2-}$, $CO_3^{2-}$, $CrO_4^{2-}$, $HCO_2^-$, $C_2H_3O_2^-$ and $C_2O_4^{2-}$. Preferably, the anion is a nitrate, an acetate, or a phosphate.

Embodiments of the present technology may employ porous filler particles, for example, siliceous porous particles and/or non-siliceous porous particles. Non-siliceous porous filler particles can include a ceramic, including calcium phosphates, hydroxyapatite, calcium carbonates, calcium sulfates, combinations thereof, and porous metal particles, for example, aluminum hydroxide. Preferably, the porous filler particle is a porous siliceous particle. The porous filler particles are advantageous in that they offer metal contact surfaces on the surface of the particle and within the pores of the particle body. Increased surface area for coating the metal particles affords higher metal particle loadings and increased uniformity of distribution of the metal particles in the conductive matrix material. The porous filler particles can include particles derived from siliceous and non-siliceous minerals having a final porosity greater than 30 percent, greater than 40 percent, greater than 50 percent, greater than 60 percent, greater than 70 percent, greater than 80 percent greater than 85 percent, greater than 87 percent, greater than 90 percent, greater than 95 percent, or greater than 99 percent. The porous filler particles can include particles derived from siliceous and non-siliceous minerals having a final porosity from about 40 percent to about 99 percent, or from about 45 percent to about 99 percent, or from about 50 percent to about 99 percent, or from about 55 percent to about 99 percent, or from about 60 percent to about 99 percent, or from about 65 percent to about 99 percent, or from about 70 percent to about 99 percent, or from about 75 percent to about 99 percent, or from about 80 percent to about 99 percent, or from about 85 percent to about 99 percent. Preferably, the porosity range of the porous filler particles is from about 80 percent to about 99 percent.

Siliceous filler particle include silica containing particle having an elemental composition comprising from about 5 percent to about 90 percent by weight of silicon, from about 0.01 to about 25 percent by weight of aluminum, from about 0.001 to about 10 percent by weight of potassium, from about 0.001 to about 15 percent by weight of sodium, from about 0.001 to about 10 percent by weight of iron, from about 0.001 to about 5 percent by weight of calcium, from about 0.001 to about 5 percent by weight hydrogen, from about 0.001 to about 5 percent by weight of magnesium. Such compositions typically further comprise trace elements, and the balance of the compositions preferably consists of oxygen. The siliceous filler particle can include several known siliceous particles having a porosity described above. Some illustrative examples include perlite, vermiculite, pumice, montmorillonite, or zeolites. In some embodiments, the siliceous filler particles can include a mixture of these exemplified siliceous filler particles.

Perlite, which may be used in embodiments of the present technology, includes expanded perlite derived from perlite ore (which belongs to the class of natural glasses) commonly referred to as volcanic glasses (which are formed by the rapid cooling of siliceous magma and lava). Perlite ore is a hydrated natural glass containing typically about 72 to 75 percent $SiO_2$, 12 to 14 percent $Al_2O_3$, 0.5 to 2 percent $Fe_2O_3$, 3 to 5 percent $Na_2O$, 4 to 5 percent $K_2O$, 0.4 to 1.5 percent CaO (by weight) and small concentrations of MgO, $TiO_2$ and other metallic constituents. Perlite ore is distinguished from other natural glasses by a higher content (2 to 10 percent by weight) of chemically bonded water, the presence of a vitreous, pearly luster, and characteristic concentric or arcuate onion skin-like (perlitic) fractures.

Vermiculite $(MgFe,Al)_3(Al,Si)_4O_{10}(OH)_2 \cdot 4H_2O$ is formed by hydration of certain basaltic minerals. Vermiculite is a member of the phyllosilicate or sheet silicate group of minerals. The basic structure of the mineral is identical to the micas and to talc: a 2:1 silicate sheet composed of two flat layers of silica and alumina tetrahedra (the tetrahedral layers), which are joined together in a layer composed of apical oxygen atoms, and magnesium, iron, and hydroxyl molecules (the octahedral layer). Between the 2:1 sheets lies the ion exchangeable layer. This layer will change in thickness depending on the interlayer cation present and the arrangement of waters of hydration associated with it.

Pumice is a type of extrusive volcanic rock, produced when lava with a very high content of water and gases (together these are called volatiles) is extruded a volcano. As the gas bubbles escape from the lava, it becomes frothy. When this lava cools and hardens, the result is a very light rock material filled with tiny bubbles of gas. The gas dissipates leaving a highly porous glass (pumice has an average porosity of 90 percent) that can be crushed to smaller particles still retaining micropores throughout the particle.

Montmorillonite $(Na;Ca)_{0.3}(Al;Mg)_2Si_4O_{10}(OH)_2 \cdot nH_2O$ is a member of the clay mineral group. It typically forms microscopic or at least very small platy micaceous crystals. The water content is variable, and in fact when water is absorbed by the crystals they tend to swell to several times their original volume. Montmorillonite is a useful mineral for several purposes and is the main constituent of a volcanic ash called bentonite.

Zeolites are microporous crystalline solids with well-defined structures. A defining feature of zeolites is that their frameworks are made up of 4-connected networks of atoms. Zeolites can also be classified as aluminosilicate minerals and have a microporous structure (pores smaller than 100 nm). Zeolites are highly porous minerals due to the water absorbed inside the zeolite's pores being driven off by heating. Approximately 175 known zeolite frameworks have been identified, and over 40 naturally occurring zeolite frameworks are known in the mineral arts. Zeolites have a porous structure that can accommodate a wide variety of cations, such as $Na^+$, $K^+$, $Ca^{2+}$, $Mg^{2+}$, and others. These positive ions or cations are rather loosely held and can readily be exchanged for others in a contact solution. Some of the more common mineral zeolites are analcime, chabazite, heulandite, natrolite, phillipsite, and stilbite. An exemplary mineral formula for one of the zeolite members is: $Na_2Al_2Si_3O_{10} \cdot 2H_2O$, the formula for natrolite.

Porous filler particles can be manufactured from excavated ore and are commercially available in a wide array of particle sizes. Embodiments of the present technology can utilize a wide range of sized particles ranging from about 0.001 millimeter to about 5 millimeter. As used herein, the diameter of porous filler particles can be referenced as a $d_{50}$, wherein the $d_{50}$ value shows particle size distribution as a median cumulative percent particle size, in other words particles which have a diameter less than the $d_{50}$ value, the mass median diameter the value of the $d_{50}$ particle size of which divides the population exactly in two halves. This value measures the fineness of the particles. The value of $d_{50}$ of the porous filler particles can be 5 millimeter or less, 4 millimeter or less, 3 millimeter or less, 2 millimeter or less, 1 millimeter or less, 0.5 millimeter or less, 0.1 millimeter or less, 80 micrometers or less, 60 micrometers or less, 40 micrometers or less, 30 micrometers or less, 25 micrometers or less, 20 micrometers or less, 15 micrometers or less, 10 micrometers or less, 8 micrometers or less, 6 micrometers or less, or 3 micrometers or less.

The value of $d_{50}$ can be as low as 1 micrometers, or even as low as 0.5 micrometers. For example, the value of $d_{50}$ of the expanded perlite can be from about 1 μm to about 5.0 millimeter, for example, from about 10 micrometers to about 2 millimeter, from about 50 micrometers to about 1000 micrometers, or from about 100 micrometers to about 500 micrometers.

In some embodiments, particle size values pertaining to the porous filler particles can be specified as equivalent spherical diameters, and are determined by laser light particle size analysis using a Leeds and Northrup Microtrac X100 (LNM X100) available from Leeds and Northrup, North Wales, Pa., US. Similar instruments are also available from Horiba, Japan (model LA 950V2). In this technique, the size of porous filler particles in powders, suspensions, and emulsions may be measured using the diffraction of a laser beam, based on application of either Fraunhofer or Mie theory. In various embodiments, Mie theory is applied. The term "mean particle size" or "$d_{50}$" used herein is the value, determined in this way, of the particle diameter at which there are 50 percent by volume of the particles which have a diameter less than the $d_{50}$ value. In various embodiments, the preferred sample formulation for measurement of particle sizes is a suspension in a liquid. The LNM X100 instrument normally provides particle size data to two decimal places, to be rounded up or down when determining whether the particle size of an embodiment is satisfactory or meets certain specifications, or by other methods which give essentially the same result.

In illustrative embodiments of the present technology, the expanded perlite may have an aspect ratio of about 1:1 to about 1:50, about 1:2 to about 1:35, or about 1:5 to about 1:20. Aspect ratios can be calculated by the Sphericity Model from experimentally determined (using electron microscopy) surface area data as described in U.S. Pat. No. 5,846,309. Process conditions for preparing expanded perlite are disclosed in U.S. Pat. Nos. 2,455,666; 2,501,699; 2,572,483; 2,621,160; 3,097,832 and 4,525,388.

Generally, the expanded perlite employed in the metal coated filler and used in methods of the embodiments of the present technology can be prepared by methods which include crushing, grinding, milling, and screening. For example, perlite ore may be crushed, ground, and separated to a predetermined particle size range. The separate material can then be heated in air, typically at a temperature of from about 870 degrees Celsius to about 1100 degrees Celsius in an expansion furnace. The expanded perlite can be prepared using conventional crushing, grinding, and milling techniques, and can be separated to meet particle size requirements using conventional separating techniques. In some embodiments, the bulk density of the porous filler particles can range from about 10 kilograms per meter cubed ($kg/m^3$) to about 300 $kg/m^3$, or from about 10 $kg/m^3$ to about 250 $kg/m^3$, or from about 10 $kg/m^3$ to about 200 $kg/m^3$, or from about 10 $kg/m^3$ to about 150 $kg/m^3$, or from about 10 $kg/m^3$ to about 100 $kg/m^3$.

The present technology provides enhanced methods for coating a metal particle onto a porous filler particle. In an exemplary embodiment, a method includes mixing a solution of an organic diol with a plurality of porous filler particles to obtain a support mixture; contacting a metal salt solution with the support mixture forming a reaction mixture; heating the reaction mixture to a temperature within a temperature range from 20 degrees Celsius to 200 degrees Celsius, whereby the metal cations in the metal salt solution are reduced to metal particles and are disposed on the porous filler particles and on filler particle pore surfaces. In some embodiments, the method may also include isolating the metal coated filler.

An amount of porous filler particles, for example, a weighed amount of expanded perlite (commercially available as Norlite®, NorCal, Richmond Calif., USA; N50; density 4.5 to 6.6 (pounds per foot cubed), mesh size 24 to 100; and Fillite® commercially available from KELTECH Energies Ltd., India) can be dispersed in a volume of organic diol, for example, 100 milliliter (mL) of ethylene glycol heated to a temperature within a temperature range of about 150 degrees Celsius to about 200 degrees Celsius thereby forming a support mixture.

The support mixture dispersion is then mixed with a measured amount (either in solid form or in solution form) of a metal salt solution, thereby forming a reaction mixture. The reaction mixture is then heated to a temperature within a temperature range from about 20 degrees Celsius to about 200 degrees Celsius, more preferably from about 160 degrees Celsius to about 180 degrees Celsius. Optionally, to get all of the porous filler particles wetted, an ultrasonicator can be placed in contact with the reaction mixture and pulsed one to five times at 30 to 40 kilohertz at 120 Watts power setting, e.g., Ultrasonic Systems, Bangalore, India.

The reaction mixture can be stirred in a vessel while maintaining the reaction mixture within a temperature range from 20 degrees Celsius to about 200 degrees Celsius, more preferably from about 160 degrees Celsius to about 180 degrees Celsius. The time required to heat the reaction mixture can vary, but the typical heating period generally ranges from 1 minute to 24 hours. Preferably, the heating period ranges from about 1 minute to about 5 hours, and more preferably, the heating period ranges from 1 minute to 1 hour. In this example, the reaction mixture does not necessarily need to be maintained at a single, constant temperature. Instead, some embodiments include merely maintaining the temperature of the reaction mixture so that it remains within the temperature range, regardless of whether the temperature of the reaction mixture and precipitation solution fluctuates (goes up or down) during the time period. As used herein, the phrase "a temperature within a temperature range" does not necessarily require a single, constant temperature within the temperature range unless the context clearly indicates otherwise. Instead, the phrase "a temperature within a temperature range" may also include a fluctuating or variable temperature that may go up or down while still remaining within the temperature range.

The metal cations in the reaction mixture are reduced by the organic diol to metal particles having a zero valence state. Once the majority of the metal cations have been reduced to metal on the porous filler particles and on the filler particle pore surfaces, the metal coated filler samples can be taken out after about 15 minutes to about 1 hour. The metal coated filler particles can be isolated from the liquid reactants by several known methods, including, washing and filtration, centrifugation, and sedimentation. The metal coated filler particles can be recovered from the reaction mixture, for example, using a Buchner funnel having an appropriate filter attached to a vacuum source. Laboratory methods for recovering particles using a Buchner funnel include those described in Shapiro J, "High-Rate Laboratory Filtration with Buchner Funnels," Science (1961);133(3467):1828-1829. In some embodiments, the filters used to capture the acicular high aspect ratio metallic particles having a first (x) dimension ranging from about 0.1 micrometers to about 10 micrometers and a second (x) dimension ranging from about 1 micrometers to about 100 micrometers are commercially available from Millipore, Billerica, Mass. and from Whatman Kent, United Kingdom. The solid metallic particles in embodiments of the present technology can be washed after separation from the precipitation mixture with water until the conductivity of the wash water is 20 micro-ohms or less. Optionally, the isolated metal coated filler particles can be washed with an organic solvent such as a small chain alcohol. The water and/or solvent can then be removed from the metallic particles and the particles dried.

Figure 1:
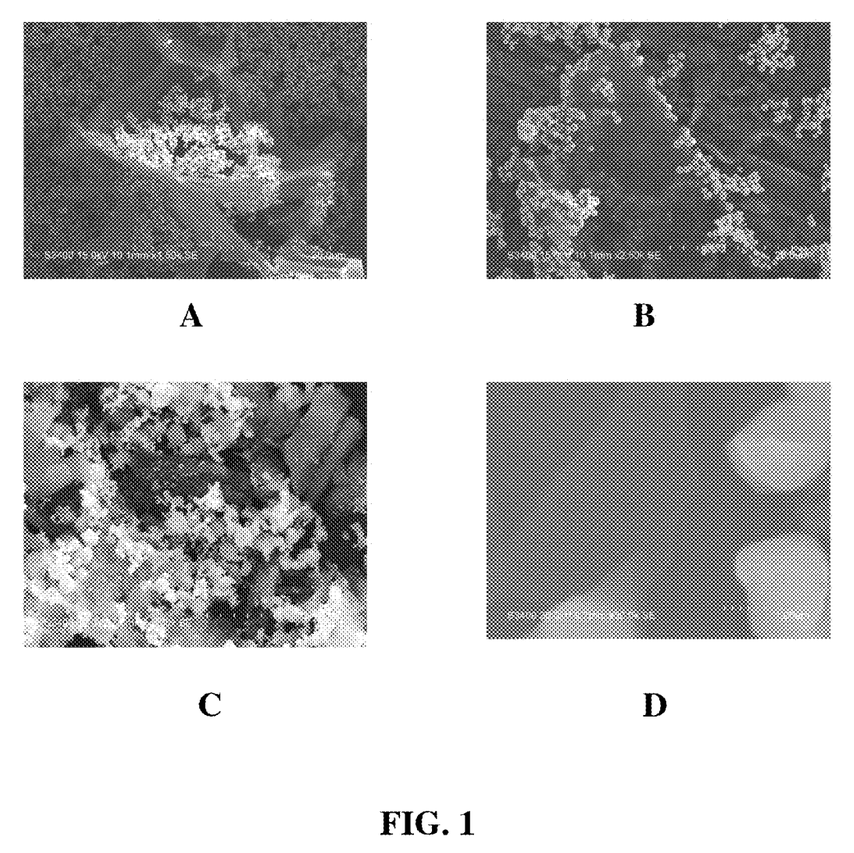
FIGS. 1A through D are scanning electron micrographs of copper and silver coated perlite siliceous filler particles produced in accordance with embodiments of the present technology. Panels A and B show expanded perlite having copper coated particles at various magnifications. Panels C and D show expanded perlite having silver coated particles at various magnifications.

Once washed, the isolated metal coated filler particles can be dried in an oven set to a temperature falling within a temperature range from about 40 degrees Celsius to about 150 degrees Celsius and dried in the preheated oven for a period of time ranging from about 1 hour to about 24 hours. The resulting metal coated filler comprising the metal coated filler particles are ready to use as is. Representative examples of perlite coated with metallic particles are shown in FIG. 1 panels A and B. As can be seen in FIG. 1 panel A, the perlite has a plurality of pores and the silver particles are coated on the surface of the perlite pores. FIG. 1, panels C and D are scanning photomicrographs of multi-metal coated perlite filler particles.

The concentration of the metal salt solution affects the resulting metal particle size coated on the siliceous filler particles. It is preferable to produce smaller metal particle sizes that are substantially uniformly distributed throughout the entire surface available to the metal salt solution, including the particle surface and within the particle pores on the surfaces of the particle pores (also referred to herein as particle pore surfaces). Illustratively, embodiments of the present methods for making a metal coated filler employ a final concentration of metal salt solution in the reaction mixture which is in the range of about 0.01 Molarity to about 1 Molarity. The final concentrations of the organic diol in the reaction mixture range from about 1 Molarity to about 10 Molarity. In some embodiments, the mole ratio of organic diol to metallic salt solution can range from about 1 to 0.001. In some embodiments, a generalized reaction can include dispersing 4 grams of copper acetate in 100 milliliter of glycol (0.2 Molarity). The ratios of metallic salt solution to organic diol can be scaled up or down according to the amount of metal coated filler particles needed.

As the surface area of the filler particles increases, a higher concentration of metal can be dispersed over the surface. For example, if silver is dispersed over a support with a BET surface area of 50 meters squared per gram ($m^2/g$), approximately 67 percent of the surface is covered by a fully-dispersed monolayer of silver at a 5 percent silver loading. But if the support BET surface area is 200 $m^2/g$, at a 5 percent silver loading only about 17 percent of the surface is covered by a silver monolayer, and the approximately 67 percent surface coverage is not approached until the silver loading is at about 20 percent. In a preferred embodiment of the present technology, the BET surface area of the filler particles is from about 10 $m^2/g$ to about 2000 $m^2/g$. As used herein, the "BET surface area" refers to the surface area of a filler particle as determined by using the Brunauer, Emmett, Teller equation for multi molecular adsorption. For further details, explanations, and examples of use of the BET equation and its applications see Introduction to Colloid and Surface Chemistry, $2^{nd}$ Edition, D. J. Shaw, published by Butterworth (Publishers) Inc, 1978.). The porous filler particles can have a surface area calculated using the BET method that ranges from about 10 to about 2000 $m^2/g$, more preferably, the porous filler particles can have a surface area ranging from about 200 to 1500 $m^2/g$, and most preferably from about 300 to about 1500 $m^2/g$.

In various embodiments, the metal salt solution preferably has a concentration of the metal cation in the presence of the organic diol sufficient to yield a metal loading on the porous filler particles which ranges from about 400 percent weight of the metal to 100 percent weight of the porous filler particles to about 100 percent weight of the metal to 100 percent weight of the porous filler particles. In other words, the total weight of the metal particles on the final metal coated filler in relation to the total weight of the porous filler particles can range from about 4 to 1 to about 1 to 1. The metal loadings of the metal particles on the porous filler particles can range from about 100 to about 400 weight percent, or from about 100 to about 300 weight percent, or from about 100 to about 200 weight percent, or from about 100 to about 150 weight percent, or from about 150 to about 400 weight percent, or from about 200 to about 400 weight percent, or from about 250 to about 400 weight percent, or from about 300 to about 400 weight percent, or from about 350 to about 400 weight percent metal to 100 weight percent of the filler particle.

In some embodiments, a second metal (e.g., silver, a corrosion inhibiting metal, etc.) can be coated on a metal coated filler originally coated with the same or different metal. The method for making a multi-metal coated filler includes the steps of mixing a solution of an organic diol with a plurality of metal coated filler particles coated with a first metal to obtain a support mixture; adding a metal salt solution having a different metal cation to the first metal coated on the metal coated filler particles with the support mixture forming a reaction mixture; and heating the reaction mixture to a temperature within a temperature range from 50 degrees Celsius to 200 degrees Celsius, whereby the metal cations in the metal salt solution are reduced to metal particles and are disposed on the surface and the pore surfaces of the metal coated filler particles.

Figure 2:
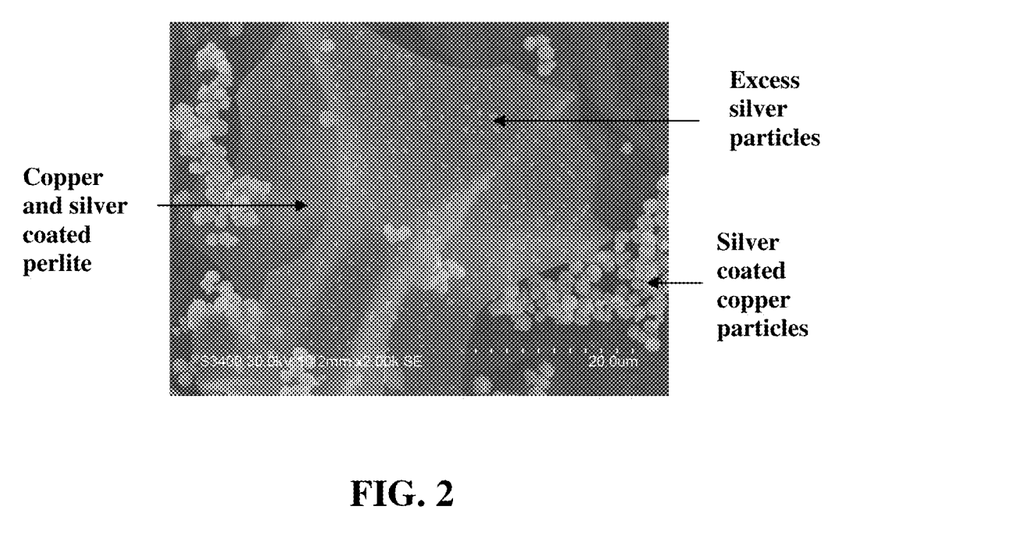
FIG. 2 is a scanning electron micrograph of silver coated onto copper coated perlite siliceous filler particles produced in accordance with embodiments of the present technology.

In some embodiments, the metal coated filler can be coated with a second metal in an aqueous medium, for example, after copper has been deposited on to porous filler particles, silver can be coated on the copper coated filler. This involves reduction of silver from silver nitrate using sodium potassium tartrate as a reducing agent onto the surface of the copper coated filler. Silver coated copper particles made in accordance with embodiments of the present technology are illustratively shown in FIG. 2.

Metal coated fillers of embodiments of the present technology may be used in a variety of electroconductive applications (e.g., highly electrically conductive injection moldable thermoplastic composites used for interconnects, circuit boards, manufacture of semiconductor devices, radio frequency identification, printed and flexible circuits, etc.) and/or thermally conductive applications (e.g., highly thermally conductive injection moldable thermoplastic composite applications, etc.). Metal coated fillers disclosed herein may be used in pastes, injection moldable conductive plastics, conductive greases, conductive putties, conductive elastomers, etc.

By way of example, a description will now be provided of some exemplary thermal applications in which may be used an injection moldable polymer (e.g., thermoplastic, etc.) composite that includes a metal coated filler of embodiments of the present technology. As a first example, an injection moldable thermally conductive polymer composite that includes a metal coated filler may be used for light emitting diode (LED) thermal management, such as with LEDs associated with home lighting, automotive tail lamps, displays and sign boards, etc. LEDs typically generate 75% to 85% of the power into heat. But excess heat directly affects LED performance. Thus, the use of an injection moldable thermally conductive polymer composite that includes a metal coated filler may allow for lower operating temperatures, which, in turn, leads to longer operating life time for the LED. Continuing with this example, the injection moldable thermally conductive polymer composite that includes a metal coated filler may be configured to satisfy the following specifications: thermal conductivity greater than 20 Watts per meter Kelvin, thermal stability of about 60 to 120 degrees Celsius, a coefficient of thermal expansion less than $5 \times 10^{-6}$/K at 20 degrees Celsius, and a Underwriters Laboratory (UL) Flammability rating of V0 or V1.

Another example use of an injection moldable thermally conductive polymer composite that includes a metal coated filler relates to thermal conductivity and/or EMI shielding for DVD pick-up trays, such as, with blue ray applications, home appliances, optical storage, etc. With DVD pick-up trays, convection cooling is not typically possible due to the high temperature of the DVD laser, and there are also space constraints due to miniaturization. In this example, an injection moldable thermally conductive polymer composite that includes a metal coated filler may be configured to satisfy the following specifications: thermal conductivity greater than 20 Watts per meter Kelvin, thermal stability of about 120 degrees Celsius, a modulus of 7 gigapascals, and a UL Flammability rating of V0 or V1.

Another example application relates to high thermally conductive plastic trays for freeze drying or ice dispensers, such as with consumer and industrial applications, healthcare, home appliances, etc. Gas assisted cooling may be inefficient with such trays, and it may also be relatively difficult to injection mold the complex parts associated with such trays. In this example, an injection moldable thermally conductive polymer composite that includes a metal coated filler may be configured to satisfy the following specifications, for example, to provide a electrically/thermally conductive eco-friendly composite: thermal conductivity greater than 20 Watts per meter Kelvin, thermal stability at negative 80 degrees Celsius, class A surface, good weatherability, UL Flammability rating of V0 or V1, and ultraviolet stability.

A further example application relates to thermally conductive plastic encapsulents/covers for motors/compressors, such as with consumer and industrial applications, electrical and electronics applications, etc. Typically, covers for motors/compressors may be difficult to injection mold due to relatively complex parts. In this example, an injection moldable thermally conductive polymer composite that includes a metal coated filler may be configured to satisfy the following specifications, for example, to offer light weight and in-build molding: thermal conductivity greater than 20 Watts per meter Kelvin, thermal stability of about 100 degrees Celsius, class A surface, good weatherability, a modulus of 7 gigapascals, and a UL Flammability rating of V0 or V1.

Micro electronics, optoelectronics and MEMS packaging is another example application in which may be used an injection moldable thermally conductive polymer composite that includes a metal coated filler. Due to miniaturization, thermal management of very small electronic devices is critical for performance of such electronic devices. In this example, an injection moldable thermally conductive polymer composite that includes a metal coated filler may be configured to satisfy the following specifications: thermal conductivity greater than 20 Watts per meter Kelvin, thermal stability of about 60 degrees Celsius, a coefficient of thermal expansion less than $5 \times 10^{-6}$/K at 200 degrees Celsius, and a UL Flammability rating of V0 or V1.

Power electronics (e.g., aerospace, power and energy, automotive applications, etc.) is another example application in which may be used an injection moldable thermally conductive polymer composite that includes a metal coated filler. Thermal management of high power devices is relatively important in order to minimize or at least reduce the device losses. In this example, an injection moldable thermally conductive polymer composite that includes a metal coated filler may be configured to satisfy the following specifications, for example, to offer high thermal conductivity with thermal stability and good manufacturability: thermal conductivity greater than 20 Watts per meter Kelvin, thermal stability of about 200 degrees Celsius, a coefficient of thermal expansion less than $5 \times 10^{-6}$/K at 200 degrees Celsius, and a UL Flammability rating of V0 or V1.

Another application relates to injection moldable heat exchangers (e.g., cross-flow heat exchangers, etc.), such as for use in electronics, industrial, power and energy applications, etc. Heat exchangers oftentimes are relatively complex metal structures that may be made by metal injection molding and laser sintering. In this example, an injection moldable thermally conductive polymer composite that includes a metal coated filler may be configured to satisfy the following specifications, for example, to offer high thermal conductivity with thermal stability and manufacturability into complex shapes (e.g., helix, etc.): thermal conductivity greater than 20 Watts per meter Kelvin, thermal stability of about 200 degrees Celsius, chemical resistance, dimensional stability, and a UL Flammability rating of V0 or V1.

A further example application relates to encapsulated/covered power supplies with high thermal conductivity molded inserts, such as for use in electronics, industrial, power and energy applications, etc. Metal panels tend to be relatively heavy and are often difficult to make into complex parts. With power supplies, electrical insulators are typically needed for isolations. In this example, an injection moldable thermally conductive polymer composite that includes a metal coated filler may be configured to satisfy the following specifications, for example, to offer large panels with insulation and insert molding with metal components: thermal conductivity greater than 20 Watts per meter Kelvin, modulus greater than 7 gigapascals, and a UL Flammability rating of V0 or V1.

Another thermally conductive example relates to radiator components, such as for use with industrial and automotive applications. Metal panels tend to be heavy and are often difficult to make into complex parts. Plus, conventional fan cooling systems not particularly efficient or effective. In this example, an injection moldable thermally conductive polymer composite that includes a metal coated filler may be configured to satisfy the following specifications, for example, to offer light weight and high cooling efficiency: thermal conductivity greater than 20 Watts per meter Kelvin, modulus greater than 7 gigapascals, weatherability, chemical resistance, and a UL Flammability rating of V0 or V1.

An additional example relates to electric car conversion kits and components, such as for use with industrial and automotive applications. In this example, an injection moldable thermally conductive polymer composite that includes a metal coated filler may be configured to satisfy the following specifications, for example, to offer lighter weights, lower costs, and/or easier to mold complex parts: thermal conductivity greater than 20 Watts per meter Kelvin, modulus greater than 7 gigapascals, weatherability, Class A surface, chemical resistance, and a UL Flammability rating of V0 or V1.

A further application relates to thermally conductive polymer based diesel pumps, such as for use with automotive and industrial applications. Diesel fuel pumps may need thermally conductive plastic/metal to help fuel flowing in sub-freezing temperatures. In this example, an injection moldable thermally conductive polymer composite that includes a metal coated filler may be configured to satisfy the following specifications, for example, to offer high thermal stability with thermal conductivity and relatively easy to mold parts: thermal conductivity greater than 20 Watts per meter Kelvin, modulus greater than 7 gigapascals, weatherability, chemical resistance, and a UL Flammability rating of V0 or V1.

Another application relates to radiant heating, such as with home/office construction and structural glazing. A radiant heating system may need a thermally conductive composite in order to uniformly heat the floor/walls. In this example, an injection moldable thermally conductive polymer composite that includes a metal coated filler may be configured to satisfy the following specifications, for example, to offer relatively uniform heat transfer: thermal conductivity greater than 20 Watts per meter Kelvin, modulus greater than 7 gigapascals, Class A surface, wear resistance, and a UL Flammability rating of V0 or V1.

An additional example relates to heat sinks, such as for use with electrical, electronics, power and energy applications. Heat sinks are often associated with complex integrated and/or flexible structures. In this example, an injection moldable thermally conductive polymer composite that includes a metal coated filler may be configured to satisfy the following specifications, for example, to offer injection moldable complex structures: thermal conductivity greater than 20 Watts per meter Kelvin, modulus greater than 7 gigapascals, thermal stability of about 40 to 100 degrees Celsius, chemical resistance, and a UL Flammability rating of V0 or V1.

Another application relates to automotive head/tail lamps reflectors or interior and exterior lighting. High power lamps may generate a lot of heat, and metal coated plastic may be unable to meet the thermal needs for such high power lamps. In this example, an injection moldable thermally conductive polymer composite that includes a metal coated filler may be configured to satisfy the following specifications, for example, to offer injection moldable structures that are relatively fast cooling: thermal conductivity greater than 20 Watts per meter Kelvin, modulus greater than 7 gigapascals, thermal stability of about 150 degrees Celsius, weatherability, and a UL Flammability rating of V0 or V1.

A description will now be given of some exemplary electrically conductive applications in which may be used an injection moldable polymer (e.g., thermoplastic, etc.) composite that includes a metal coated filler. As a first example, an injection moldable electrically conductive polymer composite that includes a metal coated filler may be used to provide board level shielding, such as with electronics and home appliances. Some existing EMI solutions involve multiple steps to achieve desirable electrical conductivity and EMI shielding and/or relatively complex parts that are difficult to manufacture. In this example, an injection moldable electrically conductive polymer composite that includes a metal coated filler may be configured to satisfy the following specifications, for example, to offer lighter weight, injection moldability, and form in place gasket applications: electrical conductivity greater than 10 Siemens per centimeter, shielding effectiveness greater than 60 decibels, thermal stability of about 120 degrees Celsius, modulus greater than 7 gigapascals, and a UL Flammability rating of V0 or V1.

Another example application relates to modular connectors and covers, such as for use with electronics. High electrical conductivity is generally needed to get good EMI shielding. In this example, an injection moldable electrically conductive polymer composite that includes a metal coated filler may be configured to satisfy the following specifications, for example, to offer lighter weight and injection moldability: electrical conductivity greater than 10 Siemens per centimeter, shielding effectiveness greater than 60 decibels, thermal stability at about 60 to about 120 degrees Celsius, coefficient of thermal expansion less than $5 \times 10^{-6}$/K at 20 degrees Celsius, and a UL Flammability rating of V0 or V1.

A further example application relates to vent panels, such as for use with power electronics and consumable electronics. High electrical conductivity is generally needed to get good EMI shielding. Traditional vent panels may include metal meshes (of fixed sizes) and frame. Plus, multiple steps may be needed to get the desired EMI shielding. In this example, an injection moldable electrically conductive polymer composite that includes a metal coated filler may be configured to satisfy the following specifications, for example, to offer the ability to make single molded light weight parts, improved injection moldability, and allow for different mesh sizes and designs: electrical conductivity greater than 10 Siemens per centimeter, shielding effectiveness greater than 60 decibels, modulus greater than 7 gigapascals, and a UL Flammability rating of V0 or V1.

An additional electrically conductive application relates to EMI enclosures (e.g., telemetric device covers, multimeter cover, gas sniff covers, optical encoder covers, speaker covers, laptop housings, etc.), such as for use with electronics and home appliances. Traditional processes typically involve multiple steps to achieve desirable electrical conductivity and EMI shielding. In this example, an injection moldable electrically conductive polymer composite that includes a metal coated filler may be configured to satisfy the following specifications, for example, to offer lighter weight, improved injection moldability of complex parts, and metal like conductivity: electrical conductivity greater than 10 Siemens per centimeter, shielding effectiveness greater than 50 decibels, thermal stability at about 120 degrees Celsius, modulus greater than 7 gigapascals, Class A surface, and a UL Flammability rating of V0 or V1.

Another example application relates to fuel cell bipolar plates, such as for use with power and energy applications and automotive applications. Traditional processes may use compression molded graphite, which may provide poor electrical conductivity that is often directionally dependent and/or has poor mechanical properties. In this example, an injection moldable electrically conductive polymer composite that includes a metal coated filler may be configured to satisfy the following specifications, for example, to offer very high electrical conductivity, need based custom design, and injection moldability: electrical conductivity greater than 100 Siemens per centimeter, thermal stability at about 120 degrees Celsius, modulus greater than 7 gigapascals, chemical resistance, and a UL Flammability rating of V0 or V1.

An further example application relates to electrically conductive polymer composite substrates for organic light emitting diodes (OLEDs) and dye-sensitized solar cells (DSSC) (e.g., organic photovoltaic cells, etc.), such as for use with electronic displays, lighting, renewable energy, etc. Typically, multiple steps may be needed to get an electrically conductive polymer substrate. In this example, an injection moldable electrically conductive polymer composite that includes a metal coated filler may be configured to satisfy the following specifications, for example, to offer lighter weight and injection moldability: electrical conductivity greater than 100 Siemens per centimeter, a UL Flammability rating of V0 or V1, flexibility, ultraviolet stability, and oxygen permeability.

In some embodiments, an isolated metal coated filler can be used as a coating for various substrates. Methods for making a conductive and/or thermally conductive article can include the steps of coating a metal coated filler on at least one surface of a substrate. In an illustrative example, a method includes preparing a metal coated filler. The metal coated filler may be made by a method comprising mixing a solution of an organic diol with a plurality of porous filler particles, for example siliceous filler particles, to obtain a support mixture; contacting a metal salt solution with the support mixture forming a reaction mixture; heating the reaction mixture to a temperature within a temperature range from about 50 degrees Celsius to about 200 degrees Celsius, to cause the metal cations in the metal salt solution to become reduced to metal particles. The metal particles thereby produced are disposed on the porous filler particles and on filler particle pore surfaces forming a metal coated filler. The metal coated filler can then be isolated using a variety of well established techniques. A matrix material is then added to the metal coated filler thereby forming an electrically and/or thermally conductive material, such as paste, injection moldable conductive plastics, conductive greases, conductive putties, conductive elastomers, etc.

In some embodiments, the matrix material can be added to the metal coated filler. The conductive material (e.g., paste, injection moldable conductive plastics, conductive greases, conductive putties, conductive elastomers, etc.) can also be made by mixing a matrix material with the metal coated filler along with one or more additional fillers including lobe-shaped particles, acicular-high aspect ratio metal particles, round metal particles, and flaky metal particles. These additional fillers can optionally be coated on other siliceous and/or non-siliceous particles as described herein, for example, perlite particles. In various embodiments, different combinations of conductive fillers may be used, for example, in polymer composites which are injection moldable to obtain a desirable level of conductivity.

An electrically and/or thermally conductive material (e.g., paste, injection moldable conductive plastics, conductive greases, conductive putties, conductive elastomers, etc.) can then be applied (e.g., coated onto, etc.) to at least one surface of the substrate.

In some embodiments, the metal coated filler can be admixed with a matrix material that can include a binder and optionally a solvent to form a conductive paste (or other material) that can be applied or coated to a variety of substrates. Coatings employing the metal coated filler produced by the method embodiments of the present technology can be applied to conductive and non-conductive substrates useful in the manufacture of multilayer ceramic capacitors, conductive films, and conductive tapes. The metal coated filler, and optionally a matrix material and a solvent can be formulated and applied to a variety of transparent and non-transparent films and other surfaces for various optical-electronic devices, such as optical filters for light scattering, radio frequency identification tags and labels, and microelectromechanical systems.

In some embodiments, coatings employing a metal coated filler are used together with an inherently non-conductive substrate such as glass, ceramic, and plastic. When the metal coated filler is admixed with a matrix material comprising a binder and optionally a solvent, the resultant conductive material (e.g., paste, etc.) can be coated on a conductive or non-conductive substrate by various coating manners such as brush coating, spray coating, roll coating, spin coating, printing, sputtering, chemical vapor deposition, and dip coating. Optionally, once the conductive material (e.g., paste, etc.) has been applied to at least a surface of the substrate, the conductive material can be cured or polymerized and then the article can be dried in an oven set to at least 100 degrees Celsius for a period ranging from about 30 minutes to about 4 hours.

Any resin can be used as a binder (resin), preferably as long as it has transparency to a light source ranging from visible light to near infrared light which is used for coating or molding. Examples of resins useful as a binder in some embodiments, include, curable and non-curable organic resins, such as acrylic resin, polyester resin, alkyd resin, urethane resin, silicone resin, fluororesin, epoxy resin, polycarbonate resin, polyvinyl chloride resin, polyvinyl alcohol resin, and radical polymerizable oligomers and highly and moderately polar monomers and copolymers thereof (possibly together with a curing agent and/or a radical polymerization initiator).

Examples of the highly polar monomers can include acrylic acid, itaconic acid, hydroxyalkyl acrylates, cyanoalkyl acrylates, acrylamides or substituted acrylamides. Examples of the moderately polar monomer include N-vinyl pyrrolidone, N-vinyl caprolactam, acrylonitrile, vinyl chloride, or diallyl phthalate.

Conductive materials, pastes, and coatings employing metal coated fillers of embodiments of the present technology can optionally include a solvent, if necessary. In some embodiments, the solvent includes any solvent which stably dissolves or disperses the binder in the matrix. Examples of suitable solvents for use in the conductive materials of embodiments of the present technology can include alcohols such as methanol, ethanol, propanol, hexanol, and ethylene glycol; aromatic hydrocarbons such as xylene, and toluene; aliphatic hydrocarbons such as cyclohexane; ketones such as acetone and methyl ethyl ketone; esters such as ethyl acetate, and butyl acetate; ethers such as ethylene glycol monobutyl ether; and a mixture thereof, in addition to water. But the solvents useful in embodiments of the present technology are not limited to these solvents. In some embodiments, electrically conductive materials or coatings of embodiments of the present technology can include an aqueous dispersed solution in which a metal coated filler is dispersed in water.

In exemplary embodiments, a matrix component and a metal coated filler are present in a conductive paste in an amount of from about 20 percent to about 95 weight percent and from about 5 percent to about 80 weight percent, respectively, based on the total weight of the conductive paste. In some embodiments, the amount of the matrix component in the conductive paste can range from about 40 percent to about 80 percent by weight of the conductive paste. The amount of metal coated filler present in the conductive paste can range from about 5 percent to about 60 percent by weight of the conductive paste.

In some embodiments, a conductive paste employing a metal coated filler can also include other optional additives, including, a polymerization initiator, crosslinking agent, photoinitiator, pigment, antioxidant, ultraviolet (UV) stabilizer, dispersant, antifoaming agent, thickening agent, plasticizer, tackifying resin, silane coupling agent, brightening agent, and the like.

Curable binders include one or more acrylate resins, epoxy resins, polydimethyl siloxane resins, other organo-functionalized polysiloxane resins that can form cross-linking networks via free radical polymerization, atom transfer radical polymerization, nitroxide mediated radical polymerization, reversible addition-fragmentation transfer polymerization, ring-opening polymerization, ring-opening metathesis polymerization, anionic polymerization, cationic polymerization, or any other method known to those skilled in the art, and mixtures thereof. Suitable curable binders can include silicone resins, for example, addition curable and condensation curable matrices as described in "Chemistry and Technology of Silicone," Noll, W.; Academic Press 1968.

The curing process can be performed by any process known to those skilled in the art. Curing can be done by methods such as thermal cure, ultraviolet light cure, microwave cure, e-beam cure, free radical cure initiated with free radical initiators and combinations thereof. Typical free radical initiators can include, for example, organic peroxides (e.g., benzoyl peroxide, etc.), inorganic peroxides (e.g., hydrogen peroxide, etc.), organic or inorganic azo compounds (e.g., 2-2'-azo-bis-isobutyrylnitrile), nitroxides (e.g., TEMPO, etc.) or combinations thereof.

In some embodiments, curing of a conductive material (e.g., coating, paste, etc.) and/or matrix material typically occurs at a temperature in a range from about 20 degrees Celsius to about 350 degrees Celsius, more typically in a range of about 50 degrees Celsius to about 320 degrees Celsius. In some embodiments, the binders are chosen such that the curing temperature is about 10 degrees Celsius to about 200 degrees Celsius. Curing typically occurs at a pressure in a range from about 1 atmosphere and about 5000 pounds pressure per square inch, more typically in a range from about 1 atmosphere and about 100 pounds per square inch. In addition, curing may typically occur over a period in a range of from about 30 seconds to about 5 hours, and more typically in a range from about 90 seconds to about 120 minutes. Optionally, the cured conductive material, paste, or coating can be post-cured at a temperature in a range from about 100 degrees Celsius to about 150 degrees Celsius over a period of from about 0.5 hour to about 4 hours, preferably from about 1 hour to about 2 hours.

In some embodiments, conductive pastes employing metal coated fillers can also be used to make electrically conductive tapes. In some embodiments, the conductive pastes can be coated onto conductive and non-conductive fibers to create a cloth like material that is electrically conductive. Exemplary conductive fibers include micron conductive fibers, for example, nickel plated carbon fiber, stainless steel fiber, copper fiber, silver fiber, aluminum fiber, or the like, or combinations thereof. Non-conductive fibers can also include Teflon®, Kevlar®, poly(ethylene terephthalate) and other abrasion resistant fiber materials that can be woven into a tape or cloth. The webbed conductive fiber can be laminated or the like to materials such as Nylon®, Teflon®, polyesters, or any resin-based flexible or solid material(s), which when discretely designed in fiber content(s), orientation(s) and shape (s), will produce a very highly conductive flexible cloth-like material. Such a cloth-like material could also be used in forming electrically conductive tapes and films that can be embedded in a person's clothing as well as other resin materials such as rubber(s) or plastic(s). When using conductive fibers as a webbed conductor as part of a laminate or cloth-like material, the fibers can have diameters of from about 3 microns to about 12 microns, typically from about 8 microns to about 12 microns, or about 10 microns, with length(s) that can be seamless or overlapping.

In various embodiments, a conductive paste can be applied directly onto a cloth material or substrate made from natural or synthetic fibers described above. The matrix material in the conductive paste can be formulated to include polymers and/or copolymers that are made to provide adhesion to other flexible or solid substrates. Such electrically conductive tapes and films can find applications in electronic devices, for example, cellular phones, personal digital assistants, computers, circuit boards, logic boards, televisions, radios, domestic appliances on the interior and/or exterior of military weapons and equipment, medical devices, for example, to provide electromagnetic interference (EMI) shielding and grounding. Conductive tapes can be made having a coating of a conductive paste of an embodiment of the present technology described above; the conductive paste can be applied in an amount of 0.01 grams per square centimeter ($g/cm^2$) to about 5 $g/cm^2$ to the tape substrate to provide electromagnetic shielding and grounding and provide thermal protection for the above electrical devices and components.

EXAMPLES

Example 1

Method for Producing a Silver Coated Filler

By way of example only and not for purposes of limitation, a description will now be provided of an exemplary method for producing a silver coated filler. In this method, an amount of expanded perlite Norlite® N50, (NorCal, Richmond Calif., United States, density 4.5-6.6 pounds per cubic foot ($lbs/ft^3$) (72-106 kilograms per cubic meter ($kg/m^3$)), mesh size 24-100) is added to refluxing ethylene glycol (1,2 ethanediol; CAS No. 107-21-1, Molecular Weight 62.07 Daltons Spectrophotometric Grade>99 percent purity, Sigma-Aldrich, Saint Louis, Mo., United States) preheated to about 180 degrees Celsius to make a 100 milliliter support mixture. A measured amount of silver acetate (acetic acid silver salt; CAS No. 563-63-3, Molecular Weight 166.91 99.99 trace metal basis, Sigma-Aldrich, Saint Louis, Mo., United States) 0.17 grams is mixed with 100 milliliter ultra pure reverse osmosis water (MilliPore Pure water) to make a silver salt solution. The silver salt solution and the 100 milliliter support mixture are added together forming a reaction mixture and sonicated. The reaction mixture is sonicated using a laboratory ultrasonicator (e.g., Branson Ultrasonics, Sonifier® Model S-450A, Danbury, Conn., United States) for complete (or at least substantially complete) wetting and removal of air from within the pores of perlite filler particles. The reaction mixture is heated to a temperature within a temperature range of about 50 degrees Celsius to about 180 degrees Celsius under relatively constant stiffing and kept within the temperature range of about 50 degrees Celsius to about 180 degrees Celsius for 1 hour to help ensure complete reduction of the silver acetate to silver metal coated on the surface and within the pores of the perlite filler particles. The silver coated perlite filler particles is then removed from the container, quenched in cold water and filtered in a Buchner funnel twice using water and then ethanol.

Example 2

Method for Producing a Copper Coated Filler

By way of further example only and not for purposes of limitation, a description will now be provided of an exemplary method for producing a copper coated filler. In this example, the methods steps for preparing a copper coated perlite particle include: first, weighing suitable quantities of the raw materials, and then mixing them in a glass container and stirring at temperatures of around 180 degrees Celsius. The perlite is mixed with ethylene glycol. A metallic salt such as an acetate (for example, silver acetate or copper acetate) is added to the ethylene glycol-perlite mixture. The perlite particles are agitated using ultrasonic agitation for complete (or at least substantially complete) wetting (and removal of air from within the pores of perlite). The ultrasonicated perlite and metal salt/ethylene glycol mixture is heated to a temperature within a temperature range of about 160 degrees Celsius to about 180 degrees Celsius under relatively constant stirring. The metal coated particle filler material produced is then filtered. The metal coated perlite particles are then dried. The copper coated metal particles can be subsequently coated with silver particles by repeating the steps above except a silver acetate salt is used to coat copper coated perlite particles.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method relating to making a metal coated filler, the method comprising:
    mixing a solution of an organic diol with a plurality of porous filler particles having pores to obtain a support mixture;
    contacting a metal salt solution with the support mixture forming a reaction mixture; and
    heating the reaction mixture, whereby the metal cations in the metal salt solution are reduced to metal particles and are disposed on the porous filler particles and on filler particle pore surfaces, such that the weight of metal particles on the porous filler particles and inside the pores ranges from 100 percent to 400 percent of the weight of the porous filler particles.

2. The method of claim 1, wherein:
    mixing a solution of an organic diol with a plurality of porous filler particles comprises mixing the organic diol and plurality of porous filler particles while at a temperature within a temperature range from about 20 degrees Celsius to about 200 degrees Celsius; and/or
    contacting the metal salt solution with the support mixture comprises stirring the metal salt solution and the support mixture while at a temperature within a temperature range from about 50 degrees Celsius to about 200 degrees Celsius.

3. The method of claim 1, wherein contacting the metal salt solution with the support mixture further comprises ultrasonicating the reaction mixture.

4. The method of claim 1, further comprising:
    mixing a solution of an organic diol with a plurality of metal coated filler particles coated with a first metal to obtain a second support mixture;
    contacting a second metal salt solution with the second support mixture forming a second reaction mixture; and
    heating the second reaction, whereby the metal cations in the second metal salt solution are reduced to metal particles and are disposed on the surface and the pore surfaces of the metal coated filler particles.

5. The method of claim 4, wherein the second metal salt solution has a different metal cation than the first metal coated on the metal coated filler particles.

6. The method of claim 1, further comprising coating the metal coated filler with a second metal coating that is the same or a different metal than that of the metal cations of the metal salt solution.

7. The method of claim 1, further comprising:
    isolating the metal coated filler; and/or
    mixing a matrix material with the metal coated filler thereby forming a conductive paste having an electrical conductivity greater than 10 Siemens per centimeter and/or a thermal conductivity greater than 20 Watts per meter Kelvin.

8. The method of claim 1, further comprising:
    mixing a matrix material with the metal coated filler thereby forming a conductive paste having an electrical conductivity greater than 10 Siemens per centimeter and/or a thermal conductivity greater than 20 Watts per meter Kelvin; and
    applying the conductive paste to at least one surface of a substrate.

9. The method of claim 8, wherein:
    the matrix material is an adhesive; and/or
    the matrix material further comprises a binder and a solvent; and/or
    mixing a matrix material with the metal coated filler further comprises mixing a matrix material with a plurality of fillers.

10. The method of claim 1, wherein the porous filler particles have an elemental composition comprising from about 5 percent to about 90 percent by weight of silicon, from about 0.01 percent to about 25 percent by weight of aluminum, from about 0.001 percent to about 10 percent by weight of potassium, from about 0.001 percent to about 15 percent by weight of sodium, from about 0.001 percent to about 10 percent by weight of iron, from about 0.001 percent to about 5 percent by weight of calcium, and from about 0.001 percent to about 5 percent by weight of magnesium.

11. The method of claim 1, wherein:
    the porous filler particles comprise perlite, vermiculite, pumice, montmorillonite, zeolite, or a combination thereof; and/or
    the porous filler particles comprise expanded perlite particles; and/or
    the organic dial comprises ethylene glycol, polyethylene glycol, polypropylene glycol, or a combination thereof.

12. The method of claim 1, wherein:
    the metal cations are selected from the group consisting of $Cu^+$, $Cu^{2+}$, $[Cu(NH_3)_4]^{2+}$, $Ni^{2+}$, $Pd^{2+}$, $Pt^{2+}$, $Al^{3+}$, $Ag^+$, $Au^+$, $Au^{3+}$, $Zn^{2+}$, $Cd^{2+}$, $Fe^{2+}$, $Fe^{3+}$, and combinations thereof; and/or
    the metal salt solution is cupric sulfate, ferrous sulfate, cobalt sulfate, nickel sulfate, ferrous acetate, copper-ammonium complex, silver nitrate, copper acetate, cobalt acetate, nickel acetate, or a hydrate thereof.

13. The method of claim 1, wherein the porous filler particles have a porosity from 30 percent to 99 percent.

14. The method of claim 1, wherein heating the reaction mixture comprises heating the mixture to a temperature within a temperature range from about 50 degrees Celsius to about 200 degrees Celsius.

15. The method of claim 1, further comprising adding a matrix material to the metal coated filler thereby forming an electrically and/or thermally conductive material having:
    an electrical conductivity greater than 10 Siemens per centimeter; and/or
    a thermal conductivity greater than 20 Watts per meter Kelvin.

* * * * *